United States Patent [19]

Hayashi

[11] Patent Number: 4,739,397
[45] Date of Patent: Apr. 19, 1988

[54] IMAGE PROCESSING APPARATUS IN WHICH THE OPERATING MODE OF EITHER A COLOR OR MONOCHROMATIC IMAGE DATA PROCESSING MEANS IS SET BY COMMAND DATA PRIOR TO RECEIPT OF EITHER COLOR OR MONOCHROMATIC IMAGE DATA

[75] Inventor: Kimiyoshi Hayashi, Tokyo, Japan
[73] Assignee: Canon Kabushiki Kaisha, Tokyo, Japan
[21] Appl. No.: 52,154
[22] Filed: May 21, 1987

Related U.S. Application Data

[63] Continuation of Ser. No. 586,736, Mar. 6, 1984, abandoned.

[30] Foreign Application Priority Data

Mar. 8, 1983 [JP] Japan ................................ 58-37713
Mar. 8, 1983 [JP] Japan ................................ 58-37714

[51] Int. Cl.$^4$ .................... G03F 3/08; H04N 1/32; H04N 1/40; H04N 1/46
[52] U.S. Cl. ...................................... 358/80; 358/75; 358/78; 358/256; 358/287; 358/280
[58] Field of Search ................ 358/75, 78, 80, 280, 358/257, 256

[56] References Cited

U.S. PATENT DOCUMENTS

| | | | |
|---|---|---|---|
| 4,000,371 | 12/1976 | Ogawa | 358/257 |
| 4,032,969 | 6/1977 | Ueda | 358/80 |
| 4,383,277 | 5/1983 | Kubo | 358/280 |
| 4,410,909 | 10/1983 | Ueda et al. | 358/78 |
| 4,472,736 | 9/1984 | Ushio et al. | 358/80 |
| 4,517,590 | 5/1985 | Nagashima et al. | 358/75 |
| 4,527,885 | 7/1985 | Ayata et al. | 358/256 |
| 4,549,219 | 10/1985 | Sue et al. | 358/257 |

FOREIGN PATENT DOCUMENTS

| | | | |
|---|---|---|---|
| 13540 | 1/1980 | Japan | 358/257 |
| 47167 | 4/1981 | Japan | 358/257 |
| 1377 | 1/1983 | Japan | 358/75 |
| 75954 | 5/1983 | Japan | 358/257 |
| 142670 | 8/1983 | Japan | 358/75 |
| 198955 | 11/1983 | Japan | 358/257 |

OTHER PUBLICATIONS

Japanese Industrial Standard, Z-8105, date unknown.

*Primary Examiner*—James J. Groody
*Assistant Examiner*—Randall S. Svihla
*Attorney, Agent, or Firm*—Fitzpatrick, Cella, Harper & Scinto

[57] ABSTRACT

An image processing system is specifically designed to process digital image data of different types, for example, by processing digital image data to print a monochromatic image with a color image printer, and includes color and monochromatic image data transmitters for transmitting digital image data such as color image data and monochromatic image data along with command data relating to an image reproduction mode. An electronic circuit is used to discriminate command data transmitted. The digital image data is processed in accordance with the discriminated command data. The command data is transmitted through a single channel to a processing apparatus sequentially before the transmission of the digital image data. In another aspect, transmitted digital color image data may be converted into digital monochromatic image data on the basis of a relative luminosity correction coefficient. A monochromatic image may thereby be produced from either transmitted monochromatic image data or the converted digital monochromatic image data.

16 Claims, 12 Drawing Sheets

| FIG. 1-2A | FIG. 1-2B |

IMAGE PROCESSING APPARATUS IN WHICH THE OPERATING MODE OF EITHER A COLOR OR MONOCHROMATIC IMAGE DATA PROCESSING MEANS IS SET BY COMMAND DATA PRIOR TO RECEIPT OF EITHER COLOR OR MONOCHROMATIC IMAGE DATA

This is a continuation of application Ser. No. 586,736, filed Mar. 6, 1984 and now abandoned.

BACKGROUND OF THE INVENTION

1. Field of the Invention

The present invention relates to an image processing system, and more particularly to an image reproducing system for reproducing a transmitted image signal.

2. Description of the Prior Art

Conventionally, systems for transmitting and receiving a color signal have suffered from such a drawback that the signal-to-noise (S/N) ratio is reduced because the color signal has been transmitted and received in the analog form. In addition, in the conventional systems, transmission of color signals in digital form is subject to various restrictions depending on the reproducing function of a receiver.

For example, when the receiver is a monochromatic image dedicated printer, the color signal which is inputted thereinto as it is can not be reproduced in monochrome or the quality of the reproduced image is deteriorated because the number of bits per picture element is different between the color image and the monochrome image.

On the other hand, when the receiver is a color image dedicated printer, inputting a monochromatic signal causes similar difficulties.

In addition, when a transmitter or receiver of different type is used, the tonality characteristic of an inputted image signal may be different from that of a printer and hence the quality of the reproduced image may be deteriorated.

SUMMARY OF THE INVENTION

An object of the present invention is to provide an image processing system which eliminates the above mentioned drawbacks associated with the conventional systems.

Another object of the present invention is to provide a digital image processing system capable of reproducing images in different modes with the use of a single image reproducing device.

A further object of the present invention is to provide an image processing system capable of processing digital image data of different types with the use of a single image processing device.

Still a further object of the present invention is to provide a digital image processing system capable of printing a monochromatic image with the use of a color image printer.

Still a further object of the present invention is to provide a system capable of reproducing a high quality image even when a transmitter and a receiver which are different from each other in image transfer characteristic are used.

Still a further object of the present invention is to provide an image reproducing system capable of reproducing an image of high quality and capable of transmitting and receiving an image reliably.

Still a further object of the present invention is to provide an image transfer system in which information representing different images such as monochromatic and color images can be transmitted and received, whereby the restrictions on an apparatus which can be connected to a network system can be reduced and a good quality color image can be reproduced.

Still a further object of the present invention is to provide an image transfer system which can be also applied to a telephone network system by appropriately adjusting the transmission speed and hence can be further expanded as a network.

DESCRIPTION OF THE PREFERRED EMBODIMENT

Figure 1:
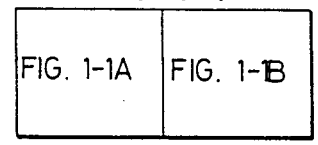
FIGS. 1-1 (1-1A, 1-1B) and 1-2 (1-2A, 1-2B) are block diagrams of an image signal transmitting and receiving system.
Figure 4:
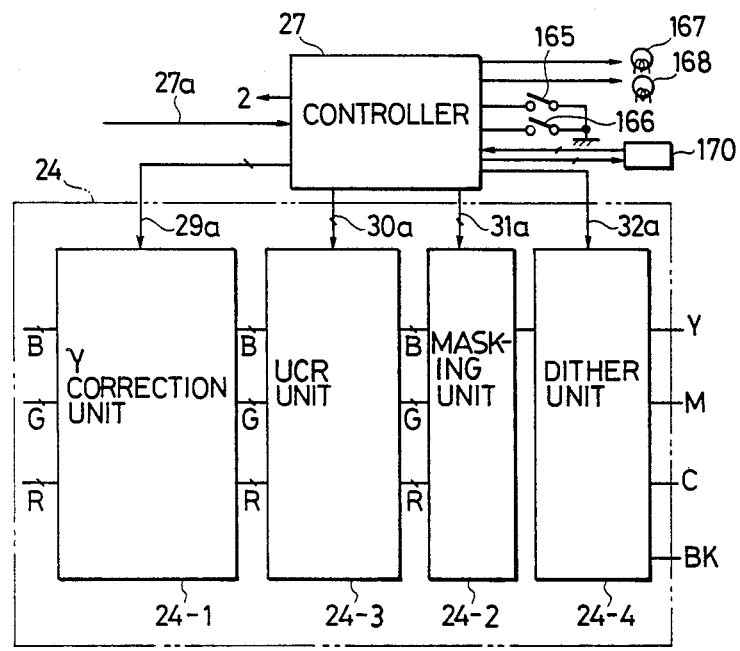
FIG. 4 is a circuit diagram of the system in FIG. 1.

FIGS. 1-1 (1-1A, 1-1B) and 1-2 (1-2A, 1-2B) are block diagrams of an image transmission processing system, in which 1 and 9 are color image pickup units, 1a, 1b and 1c are respectively CCD sensor for sensing the light of red (R) color, a CCD sensor for sensing the light of green (G) color and a CCD sensor for sensing the light of blue (B) color, 1f is an amplifier for controlling and amplifying signal data from the CCD sensor (R) 1a, CCD sensor (G) 1b and CCD sensor (B) 1c, 1d is an A/D converter for analog-to-digital converting a signal from the amplifier 1f, 1e is a controller for controlling the amplifier circuit 1f, 2 and 10 are color image transmitting modules, 3 and 11 are controllers for use in the color image transmitting modules, 4 and 12 are memories for recording signals from the color image pickup units, 5 and 13 are parallel-to-serial converters for parallel-to-serial converting R, G and B signals from the memories 6 and 14 are selectors for selectively switching image data and control data, 7 is a network system to be coupled to the color image transmitting modules, 8 is a host computer for controlling the network system, 15 is a monochromatic image pickup unit, 16 is a monochromatic image transmitting module, 17 is a memory for recording monochromatic image data, 18 is a controller for the monochromatic image transmitting module, 20 is a data selector for selectively switching data and is similar to the selectors 6 and 14, 21 and 28 are color image receivers, 22 and 29 are selectors for selecting data within the color image receivers, 23 and 30 are serial-to-parallel converters for serial-to-parallel converting signals from the selectors 22 and 29, 24 and 31 are operation processing sections for operation processing R, G and B signals to produce complementary-yellow (Y), magenta (M), cyan (C) and black (Bk) signals, the block diagram of which being shown in FIG. 4, 25 and 32 are memories for storing the Y, M, C and Bk signals, 26 and 33 are color laser beam printer (LBP) units for receiving the individual color signals to form images on color recording materials, 27 and 34 are controllers for the color image receivers, 35 is a monochromatic image receiver, 36 is a selector for selecting image and control signals within the monochromatic image receiver, 39 is a memory for storing monochromatic image data, 40 is a LBP unit for recording image data from the memory 39 on a recording material, and 41 is a controllor for the monochromatic image receiver.

Figure 1A:
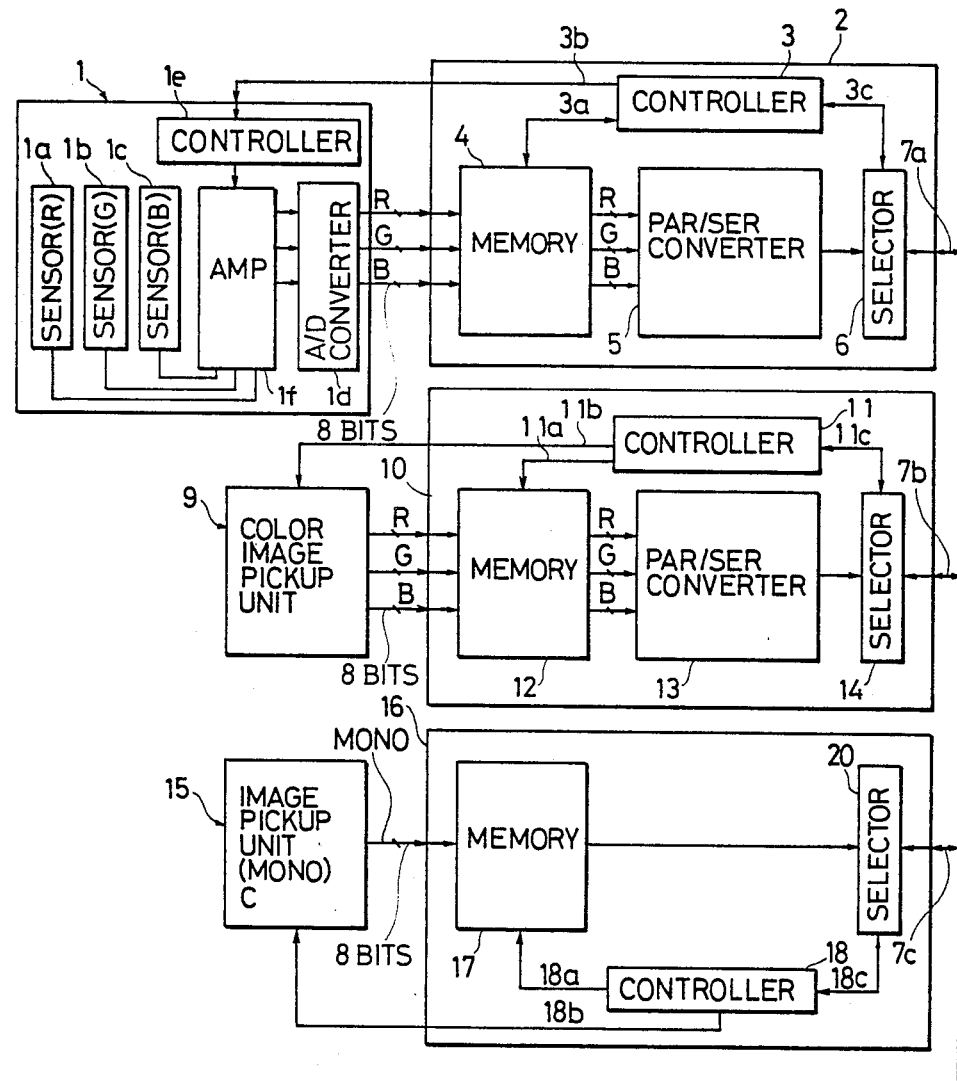
Figures 1, 2, 2B:
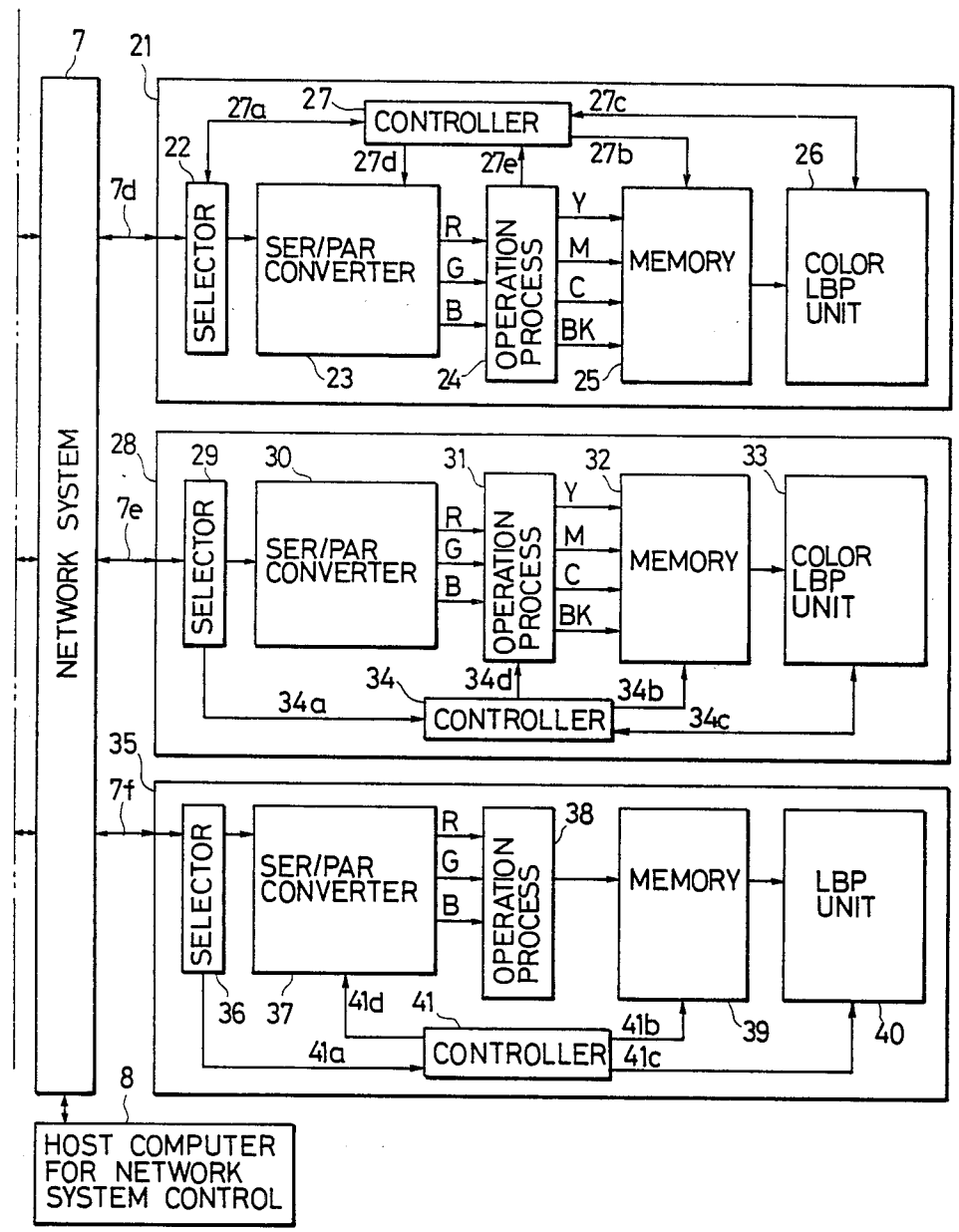
FIGS. 2 and 11 show registers for discriminating commands.
Figure 2:
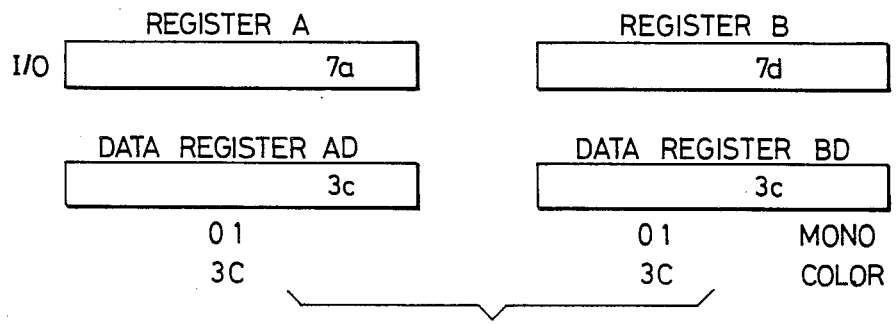

The system shown in FIG. 1-2 is constructed in such a manner that the modules may be arranged to connect to any other module in FIG. 1-1, for example, the module 16 to the module 21 or 28 and the module 35 to the module 1 or 10. In the module 16, 19 is a parallel-to-serial converter capable of parallel-to-serial converting the signals from the memory 17 and in the module 35, 37 is a serial-to-parallel converter for serial-to-parallel converting the signal from the selector and 38 is an operation processing section for converting R, G and B signals into luminance signals. The controllers 27, 34 and 41 in the receiving modules switch coefficients for γ correction in the processing sections in accordance with controlling transmitted data from the selectors 22, 29 and 36, such as command data for γ correction transmitted via lines 7d, 7e and 7f.

Figure 3:
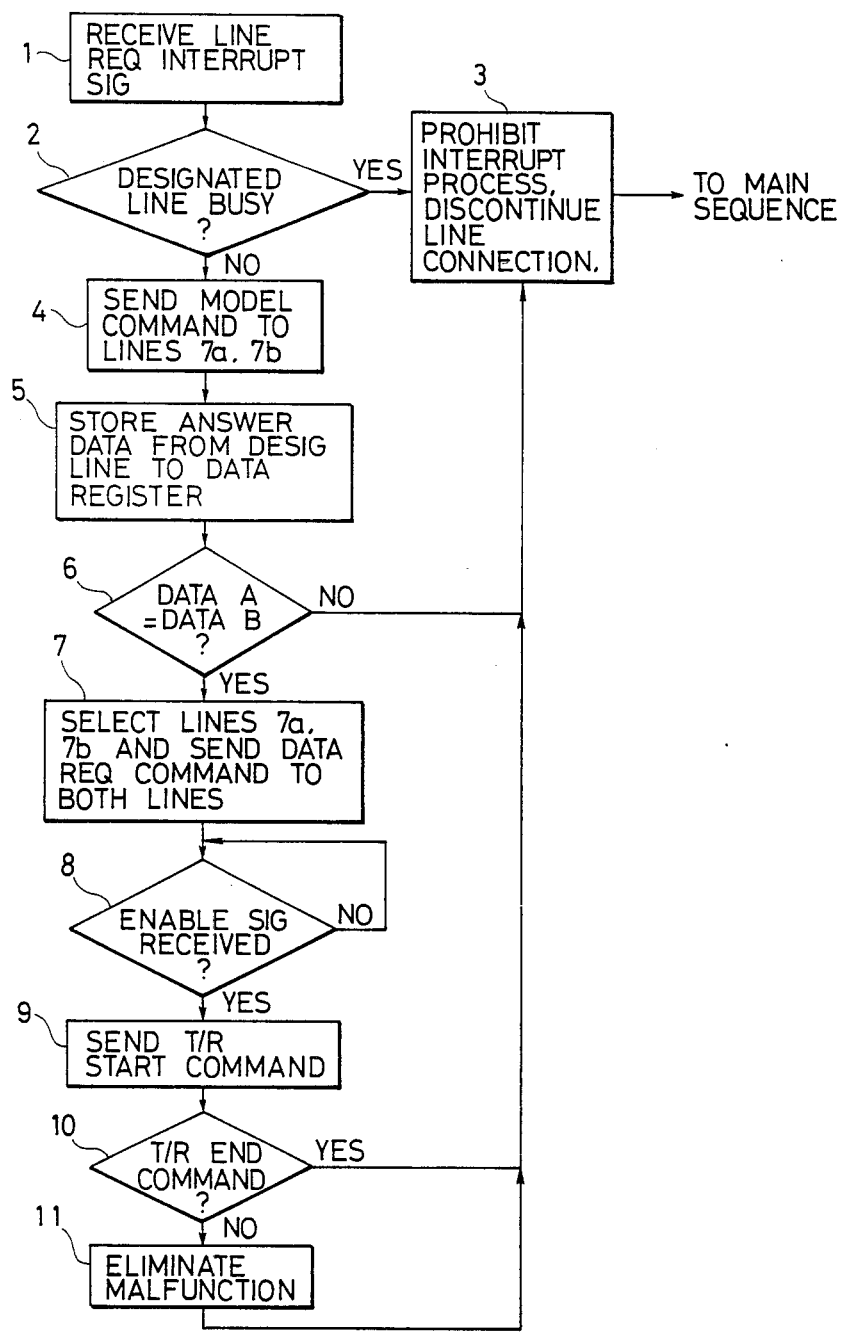
FIGS. 3 and 5 are flow charts for controlling transmission operation.

The host computer 8 includes registers shown in FIG. 2 and a microcomputer (not shown) to perform data transmitting, processing and controlling operations shown by the flow chart in FIG. 3.

The individual image pickup units 1, 9 and 15 send digital signals, which have tonality of 8 bits per picture element after being A/D converted, to the transmitting modules 2, 10 and 16. The transmitting modules convert data of 24 bits consisting of 8 bits per image for B, G and R images and data of 8 bits for the monochrome image into serial data and send them to the respective output lines. Accordingly, the time required for transmitting one picture element of the monochrome image is one-third the time required for the color images. Similarly, data of 24 bits for the color images and of 8 bits for the monochrome image are serially transmitted to the input lines of the receivers.

In this connection, prior to the transmission and reception of the image data, the system is checked and set by means of command signals with respect to the idleness of the lines, the type of the receivers and the possibility of operation. Also, the coefficients are set in the image processing section 24 in accordance with the transmitted command signals, thereby prohibiting the connection of the color image pickup unit to the monochrome image dedicated printer and prohibiting or conditionally permitting the connection of the monochrome image pickup unit to the color image dedicated printer. In addition, the γ correction coefficients in the correction processing section 24-1 in FIG. 4 for linearizing the tonality characteristic in the printer image processing section 24 are switched for a vidicon or a CCD image pickup unit which is connected to the printer. Accordingly, even if the type of the image pickup unit is changed, a printed image which is superior in tonality characteristic can be obtained from the printer which is commonly used for printing color and monochrome images.

Also, the transmitted command signal permits the switching and selection of the masking coefficient unit (24-2), UCR coefficient unit (24-3) and dither matrix pattern unit (24-4) in the color image processing section 24. Here, the masking coefficient set by unit 24-2 is an operation coefficient for individual color signals such as the B, G and R signals to be used for masking by which three color signals are processed to obtain one mixed color signal and hence the impurity of developers for Y, M and C can be corrected so as not to deteriorate the color image quality. The tone of the reproduced image can be changed by changing the operation coefficient set by unit 24-3. The UCR coefficient is the percentage of black component for under color removal (UCR) i.e. for removing a black component signal from each of the B, G and R signals, by which excessive blackening can be avoided when blackening black component with the black developer. Changing the percentage changes the degree of blackening. The dither matrix pattern set by unit 24-4 is a threshold matrix pattern for reproducing a half tone with binary levels. Changing the pattern changes the range of the density levels for reproducing the tonality of the image.

The network 7 performs the connection and switching between the image pickup unit and the printer under the control of the host computer 8 and may be a well known converter.

As explained with reference to FIGS. 2 and 3, first, the host computer 8 jumps to the interrupt routine (Step 1) when receiving a line request program interrupt signal from one of the transmitting modules, judges whether the requested line of interest is busy or not (Step 2), and stops the interrupt routine when it is busy (Step 3). On the other hand, when the line is not busy, the host computer 8 selects the requested lines 7a and 7b, for example, and sends question commands (model command) to both of the lines. It is also possible to send the commands from the transmitting modules while causing the host computer 8 to perform only the selection and connection of the lines. This question command is issued to ask the model of the image pickup unit and the printer, in response to which the model data such as monochrome and color are provided from the transmitting module and the receiving printer. The answer data are respectively written into data registers AD and BD designated by registers A and B (Step 5). The data in the registers A and B are addresses of the transmitting module and the receiver (here lines 7a and 7d). The controllers in the transmitting module and the receiver judge the question commands and send the answer data to the host computer through the connecting lines.

Next, the data in the registers AD and BD are compared with each other (Step 6) and if the data are equal data request commands are sent to both of the modules since the data in the registers are for, for example, color images (Step 7). On the other hand, if any of the data is not for a color image, the line is disconnected and the host computer returns to the main routine. The data request command is given out for asking if the image data is already stored in the module memory and if the image data still remains in the receiving memory, that is, if it is now printing out. If the image data is stored in the transmitting module memory 4, a transmission enable signal will be sent to the host computer 8. If the receiving memory 25 is vacant, a reception enable signal will be sent to the host computer 8. The host computer, after recognizing that both of the enable signals are received, sends transmission and reception start commands to the respective modules (Step 9). The host computer waits until the enable signals are received.

The transmitting module which receives the transmission start command outputs the R, G and B signals in 24 bits (=3×8) from the memory 4, and parallel-to-serial converts and transmits the signals for one line. At this time, the selector 6 switches the connection of the transmission line 7a from the controller 3 to the parallel-to-serial converter 5.

On the other hand, in the color image receiver 21, the controller 27 switches the selector 22 in such a manner that the signal on the line 7d is connected to the serial-to-parallel converter 23. The signal is converted into parallel R, G and B signals by the converter 23 and operationally processed in the processing section 24 for the purpose of converting the B, G, R signals into Y, M, C, Bk signals for the color LBP unit 26. That is, in the processing unit, the black component is extracted by the UCR processing unit 24-3 and the color is corrected by the masking unit 24-2 with the use of a multiplier ROM and an adder ROM for high speed processing.

At the completion of the color information transfer, an end signal is sent from the module and the receiver to the host 8 which, in turn, recognizes it (Step 10), cancels the interrupt routine and returns to the main routine.

If the host computer selects the lines 7a and 7f, sending the model command in the above mentioned manner will result in returning the color answer data and the monochrome answer data from the module 2 and the receiver 35, so that the host computer will return to the main routine instead of stepping on the next step due to the non-coincidence of data.

If the host computer selects the line 7c with the monochromatic image pickup unit and the line 7d with the color printer, the image transmission can be executed in the same manner as when the lines 7a and 7d are selected by exchanging the question command and the answer data.

In case of selecting the lines 7c and 7d, when each module judges the transmission start command, the controller 27 for the color printer capable of printing a monochromatic image judges the monochrome command data transmitted from the transmission module and performs such a control as to cause the image data to be inputted into the BK (black) area in the memory.

In case of selecting the line 7e which is connected to the color printer 33 and the above mentioned line 7c, the transmission is also possible as mentioned above. In this case, the dither unit 24-4 performs processing for black.

On the other hand, when the γ correction command data is transmitted to the receiver, the controller 27 recognizes it and switches to and selects the γ correction unit 24-1 (see FIG. 4).

It should be noted that the monochrome command data and the γ correction command data are directly sent from the transmission module controller to the printer immediately after the controller judges the transmission start command from the host computer 8. Then, the image data is subsequently transmitted when a predetermined period of time elapses after the transmission of the commands such as a γ correction command and the like. Instead, the image data may be transmitted only after the transmission module receives a signal indicating that the receiver judges these commands.

Figure 5:
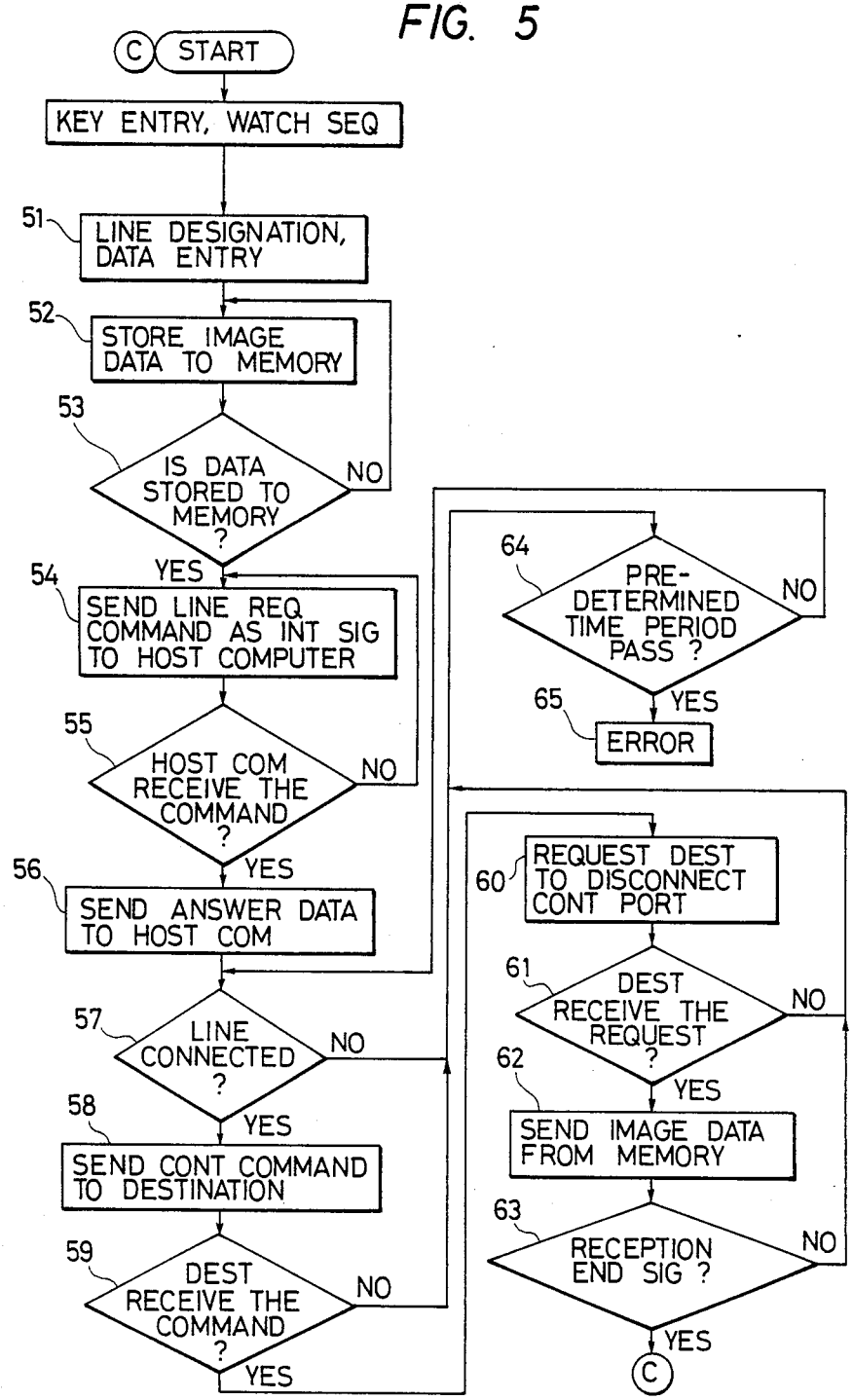

Next, the control of the image pickup unit will be described with reference to FIG. 5. The flowchart in FIG. 5 is for a computer program contained in the transmission module controller 3. The program, when keyed in through a transmission module terminal (51), is instructed to store the image data in the memory 4 (52), then judges whether the image data is stored in the memory 4 or not (53), and requests the host computer 8 for the connection to a designated line (54). The program, when the host computer accepts the line request command (55), sends the answer data to the host computer (56) and confirms whether the host computer is connected to the line or not (57). Then, the program sends the control commands for γ correction, monochrome or the like to the receiver of the destination (58), confirms whether the destination accepts the signal or not (59), requests the destination to disconnect the control port by means of the selector (60), confirms whether the port is disconnected or not (61), and sends the image data from the memory (62). Then, the program, after waiting and confirming the reception of the confirmation signal from the receiver (63), returns to the key entry routine. In the absence of the confirmation signal, an error signal is generated (65) after a predetermined period of time passes (64).

Returning to FIG. 1-2, the transmission of the command and the image data will be described.

The host computer 8, when selecting the lines 7a and 7d, sends the transfer data request command to the first color image transmitting module 2 connected with the line 7a and the reception request command to the first color image receiver 21 connected with the line 7d.

The controller 3 in the first color image transmitting module 2, after receiving the command from the host computer, confirms whether the image data is stored in the memory 4 or not, and sends the transmission enable command to the host computer 8 when the image data is stored in the memory. On the other hand, when no data is stored, the controller 3 requests the controller 1e in the first color image pickup unit 1 for the image data and sends the transmission enable command to the host computer 8 after the data which is transferred from the color image pickup unit 1 is stored in the memory 4.

Similarly, the color image receiver 21 confirms whether the controller is transferring a signal from the memory 25 to the first color image LBP unit 26 and, if NO, sends the reception command to the host computer, or, if YES, sends it to the computer at the completion of the transfer.

The host computer which receives the transmission enable command and the reception enable command sends the transfer start command to the first color transmitting module 2 and the reception start command to the first color image receiver 21.

Figure 6A:
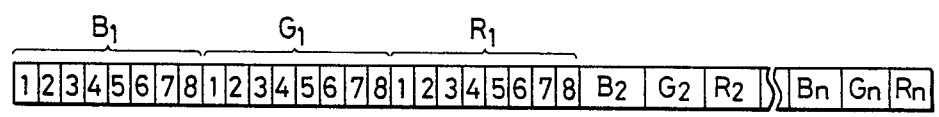
FIGS. 6(a) and 6(b) show a concept of data transmission.

The first color image transmitting module which receives the command gives an instruction to send the R, G and B parallel signals from the memory 4 for data transmission. The data is represented by the conceptual schema in FIG. 6(b) when outputted from the memory 4. The data is transferred in the form as shown by the conceptual schema in FIG. 6(a) after passing through the parallel-to-serial converter 5. The conceptual schema (b) shows that the parallel data are simultaneously outputted, while the conceptual schema of FIG. 6(a) shows that the bits for the individual separated color signals which are serial in time are sent out with time. The selector 6 connects the data outputted from the parallel-to-serial converter 5 to the line 7a in this manner. That is, the data collision is avoided by switching the data transmission from the host computer to the controller to the circuit for the memory.

Figure 6B:
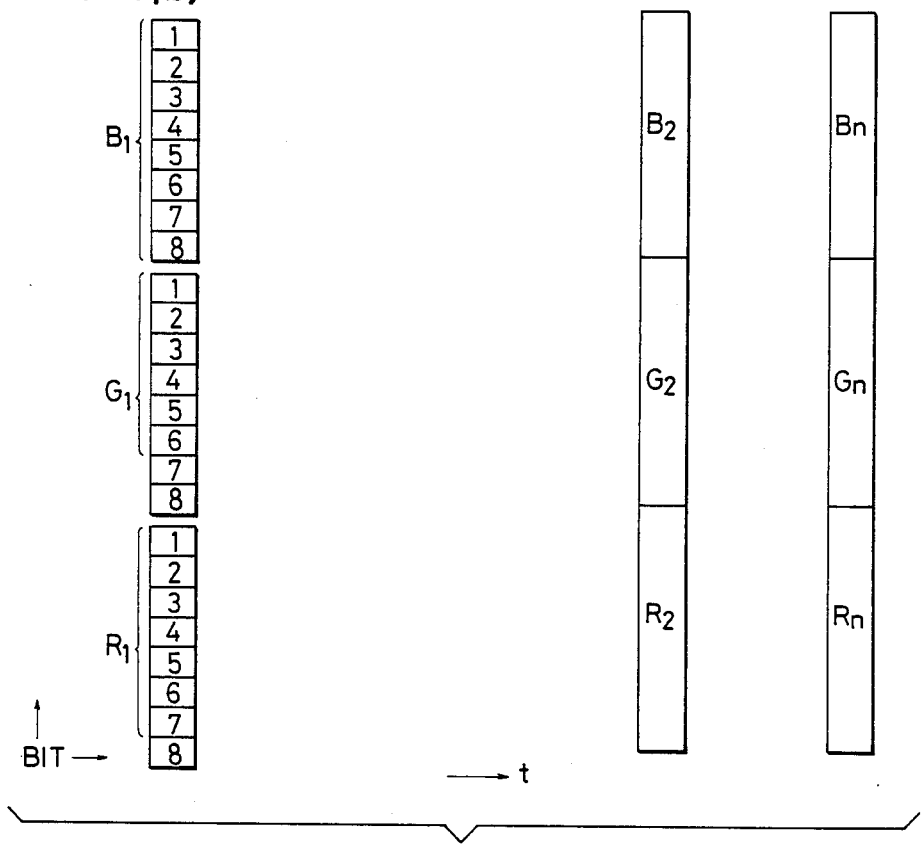

On the other hand, in the first color image receiver 21, the controller 27 switches the selector 22 in such a manner that the signal from the line 7d is connected to the serial-to-parallel converter, by which the data in FIG. 6(a) are converted into the data in FIG. 6(b), that is, the serial R, G and B signals are converted into the parallel signals by the serial-to-parallel converter 23. The above mentioned signals are operated and corrected into the form suitable for the characteristic of the color LBP unit 26. In this case, high speed operation is required. For this purpose, the black component extraction by the UCR unit 24-3 (under color removal) and the color correction by the masking unit 24-2 can be realized with the use of the multiplier ROM and the adder ROM.

The data processed in the operation processing section 24 are stored in the memory 25 because timing control is needed due to the different data transfer speed and write timing of the color LBP unit.

The controller 27 in the first color image receiver causes the color LBP unit 26 to operate after the color signals are stored in the memory 25 and creates a color copy by sending the individual color signals from the memory to the color LBP unit 26 at the timing required by the unit 26. The color LBP unit 26 includes dither circuits for individual colors and dither pattern memories for Y, M, C and Bk colors.

The host computer 8, when selecting the lines 7a and 7f, sends the transfer data request command to the first color image transmitting module 2 connected with the line 7a and the reception data request command to the receiver 35, dedicated to monochrome reproduction, which is connected to the line 7f.

The first color image transmitting module 2, which receives the command, sends the transmission enable command to the host computer 8 after the above mentioned operation. On the other hand, the controller 41 in the receiver 35 confirms whether the content of the memory 39 is being transferred to the LBP unit 40 or not and sends the reception enable command to the host computer 8 at the completion of transfer.

The host computer 8 which receives both commands sends the transmission start command to the first color image transmitting module 2 and the reception start command to the receiver 35.

The first color image transmitting module 2, which receives the transfer start command, transfers the data in the above mentioned manner to send the color image signal on the lines 7a and 7f.

Figure 7:
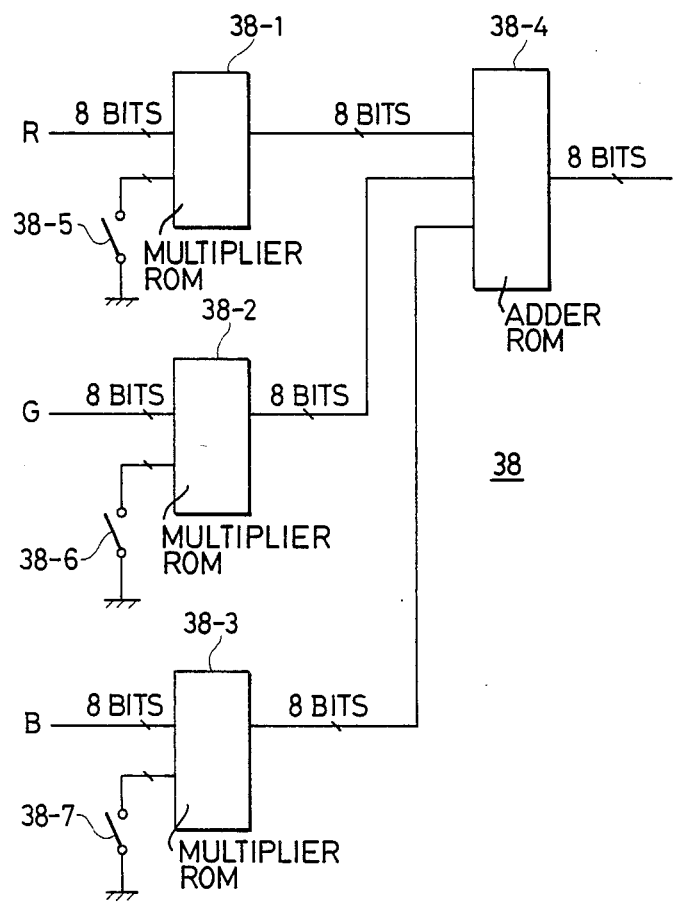
FIG. 7 is a circuit diagram of a first operation processing section in FIGS. 1-1 and 1-2.

On the other hand, the controller 41 in the receiver 35 which receives the reception start command from the host computer 8 connects the line 7f to the serial-to-parallel converter 37 through the selector 36. The color image signals which are serial-to-parallel converted by the serial-to-parallel converter 37 are outputted as the parallel data for R, G and B, which are, in turn, converted into luminance signals by the operation processing section 38 (FIG. 1-2B). As a practical example of the operation processing section 38, as shown in FIG. 7, the data which are inputted into the adder ROM 38-4 for adding the R, G and B signals respectively passing through the multiplier ROM 38-1 for multiplying the R signal by $\frac{1}{3}$, the multiplier ROM 38-2 for multiplying the G signal by $\frac{1}{3}$ and the multiplier ROM 38-2 for multiplying the B signal by $\frac{1}{3}$ are converted into luminance signals, thus converted into monochrome signals.

Next, the data is stored in the memory 39 in order to adjust the timing to that of the LBP unit 40. At the same time, the controller 41 operates the LBP unit 40 and starts to transfer the data to the memory 39 at the timing required by the LBP unit. The LBP unit, which receives the image data, creates a hard copy. As will be apparent from the above, a clear monochrome copy can be obtained even when receiving the color image signals. In addition, multiplication with a variety of different coefficients can be realized by setting a value other than $\frac{1}{3}$ in each of the color signal multiplier ROMs in the operation processing section and connecting or disconnecting individual switches 38-5, 38-6 and 38-7. Here, it is also possible to make a monochrome copy which is easily perceived by the human eye by inputting the coefficient for relative luminosity correction, in advance.

Next, the case that the host computer 8 selects the monochromatic image pickup unit 15, the monochromatic image transmitting module 16 and the receiver 35 dedicated to the monochromatic image reproduction will be considered. That is, the host computer 8 selects the lines 7c and 7f and sends the transmission start command and the reception start command respectively to the controller 18 in the monochromatic image transmitting module 16 and the controller 41 in the receiver 35. Then, the image signal is sent from the pick up unit 15 to the memory 17 from which, in turn, the data which are the same as the A/D converted values of the luminance signals and are arranged in parallel three times are supplied to the line 7f through the selector 20 and the line 7c. The data are sent out as the three signals which are serial-to-parallel converted by the converter in order that the controller 41 in the receiver 35 connects the selector 36 to the serial-to-parallel converter. However, since the signals are the same, the same data can be obtained even when added. The added data is stored in the memory 39 under the operation of the controller 41 in the module 35 and supplied from the memory to the LBP unit 40 at the control timing of the LBP unit 40. Such an arrangement makes it possible to establish the communication between the monochromatic image pick up unit and the monochromatic image reproduction dedicated receiver.

Next, the case that the monochromatic image transmitting module 16 and the first color image receiver 21 are selected will be described with reference to FIG. 1-2. That is, the host computer 8 selects the lines 7c and 7d and sends the transmission and reception start commands to the controller 18 in the monochromatic image transmitting module 16 and the controller 27 in the color image receiver 21, respectively. In response to the command, the controller 18 in the transmitting module 16 sends the data from the memory 17 in the above mentioned manner to the first color image receiver. Thus, the controller 27 in the color image receiver 21 connects the signal from the line 7c through the selector 22 to the serial-to-parallel converter 23 to output the data in the parallel form. In the monochromatic image transmitter 16, since the same data are included in the data lines for R, G and B signals, the data are operated on in the operation processing unit 24. The lowest value signal among the B, G and R signals is selected to be the black signal. In this case, only a black signal is generated due to the same signal data. Accordingly, the monochromatic image data is supplied to the memory 25. Then, the controller 27 supplies the data from the memory 25 at the timing required by the color LBP unit 26 thereby permitting a monochromatic copy to be produced.

Although various combinations have been described above, the simultaneous transmission from one color image pickup unit 1 to the first and second color image receivers and the monochromatic image reproduction dedicated device is also possible. As is apparent from the above description, the first and second color image receivers can take a color copy when a color signal is inputted and a monochromatic copy when a monochromatic signal is inputted. In addition, sending data from the monochromatic image pickup unit 16 to each of the receivers results in producing a monochromatic copy.

Figure 8:
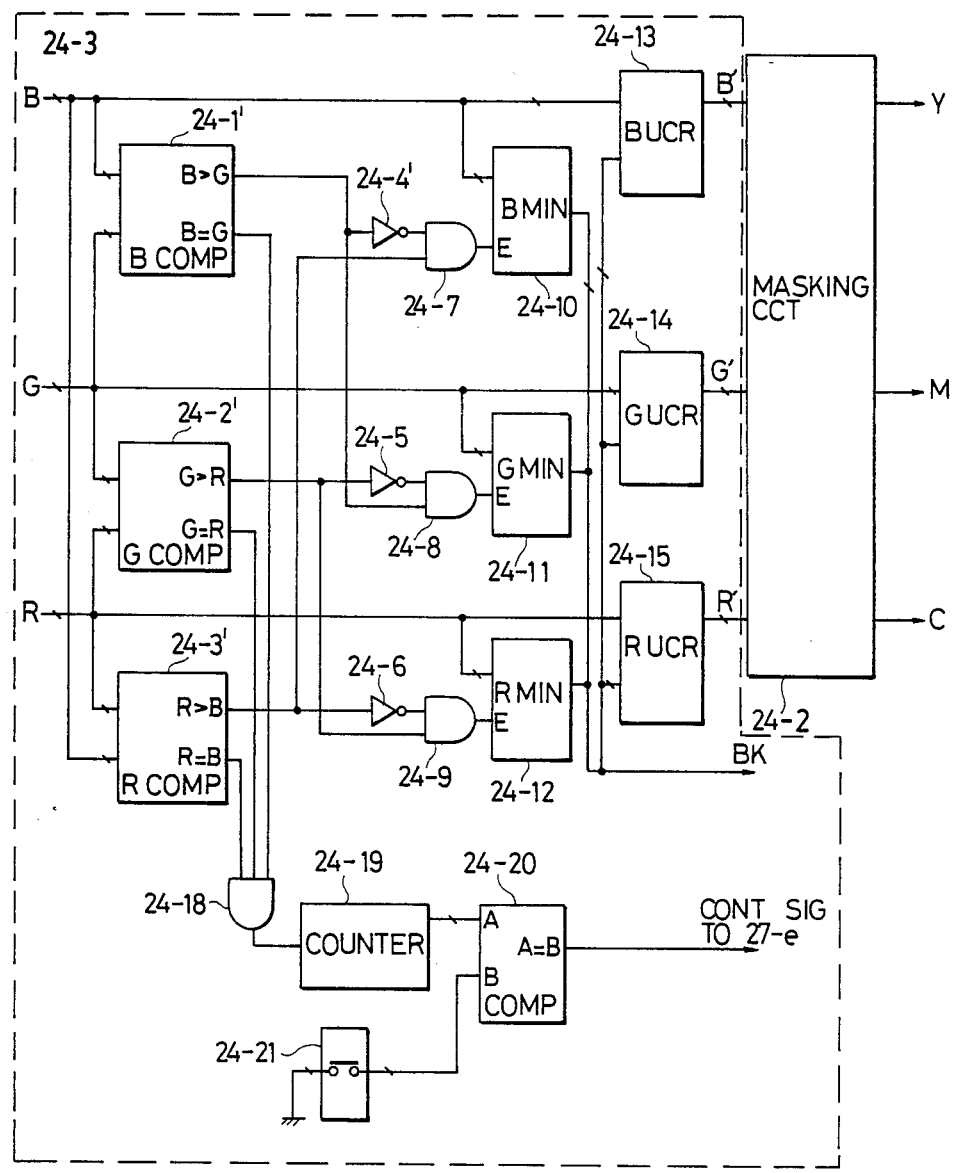
FIG. 8 is a circuit diagram of a second operation processing section in FIGS. 1-1 and 1-2.

The circuit for the operation processing section 24 in the color image receiver is arranged as shown in FIG. 8 in which 24-1' is a B comparator for comparing the values of the B and G signals, 24-2' is a G comparator for comparing the values of the G and R signals, 24-3' is an R comparator for comparing the values of the B and R signals, 24-4', 24-5 and 24-6 are inverters, 24-7, 24-8 and 24-9 are AND circuits, 24-10, 24-11 and 24-12 are minimum value data storing RAMs for the B, G and R signals, respectively, 24-13, 24-14 and 24-15 are subtracter ROMs for respectively calculating subtractions B-Bk, G-Bk and R-Bk, 24-17 is a masking circuit for correcting the color of each of the B, G and R signals thus processed (under color removal), 24-18 is an AND circuit for ANDing the discriminating signals from the B, G and R comparators, 24-19 is a counter for counting the ANDed output, 24-20 is a comparator and 24-21 is a switch used for selecting initiation data.

The operation processing unit 24, when the B, G and R signals are supplied from the serial-to-parallel converter 23 in the color image receiver, performs two main processings, that is, under color removing and masking. Under color removing means to print in black ink the minimum value signal among the R, G and B signals, which is considered black due to the three-color components included therein and to print the remaining colors by the amount determined by subtracting the amount of the black component. Masking means to complement an opaque or turbid portion of a printing material for each color component with another color thereby allowing the color of the printing material to approach a read-out color.

An example of the high speed operational processing of the UCR circuit will be described with reference to FIG. 8. The B and G signals are compared in the B comparator 24-1', the G and R signals are compared in the G comparator 24-2' and the R and B signals are compared in the R comparator 24-3'. Here, the B comparator 24-1' outputs H level signal when $G>B$ and the remaining comparators respectively output H level signals when $R>G$ and $B>R$. Thus, when the output from the B comparator through the inverter 24-4' and the output of the R comparator are at H level, it is considered that $R>B$ and $G>B$, so that the B signal is considered to be the minimum. Thus, the AND circuit 24-7 adds both outputs to output a signal indicating that the B signal is minimized. In the same manner, the AND circuit 24-8 outputs a signal indicating the minimum G signal value and the AND circuit 24-9 outputs a signal indicating the minimum R signal value. When $R>B$ and $G>B$, because the signal which is discriminated by the AND circuit 24-7 is at H level, the enable terminal E of the B RAM 24-10 is actuated and the value of the B signal is stored in the RAM. This data is inputted into input addresses of the B-Bk under color removing (UCR) ROM 24-13, the G-Bk UCR ROM 24-14 and the R-Bk UCR ROM 24-25. On the other hand, the B, R and G signals are inputted into the addresses, so that B', G' and R' signals are calculated from B-$B_{MIN}$, G-$B_{MIN}$ and R-$B_{MIN}$ signals respectively. Here, $B_{MIN}$ is outputted as Bk and the B signal goes to 0. Then the successive signals are calculated and the Bk level is determined. The R', B' and G' signals are further subjected to primary masking in the masking circuit 24-17 which, in this case, constitutes a circuit for operating the masking equations for the individual color components in the arithmetic ROM at high speeds, respectively converted into Y, M and C and outputted.

On the other hand, when a monochromatic image is inputted, the B, G and R are sent with the same data, so that the outputs of the B, G and R comparators 24-1', 24-2' and 24-3' are at the same value and hence the output of the AND circuit 24-18 is at H level. Here, predetermined data is set in the switch 24-21 because there is a possibility that the outputs would be at the same value even when a color signal is transmitted. Thus, the output from the AND circuit 24-18 is counted by the counter 24-19 up to the data set in the switch 24-21. Then the comparator 24-20 judges that the counted value is equal to the set data and outputs a signal 27-e indicative of a monochromatic image to the controller 27.

Figure 9:
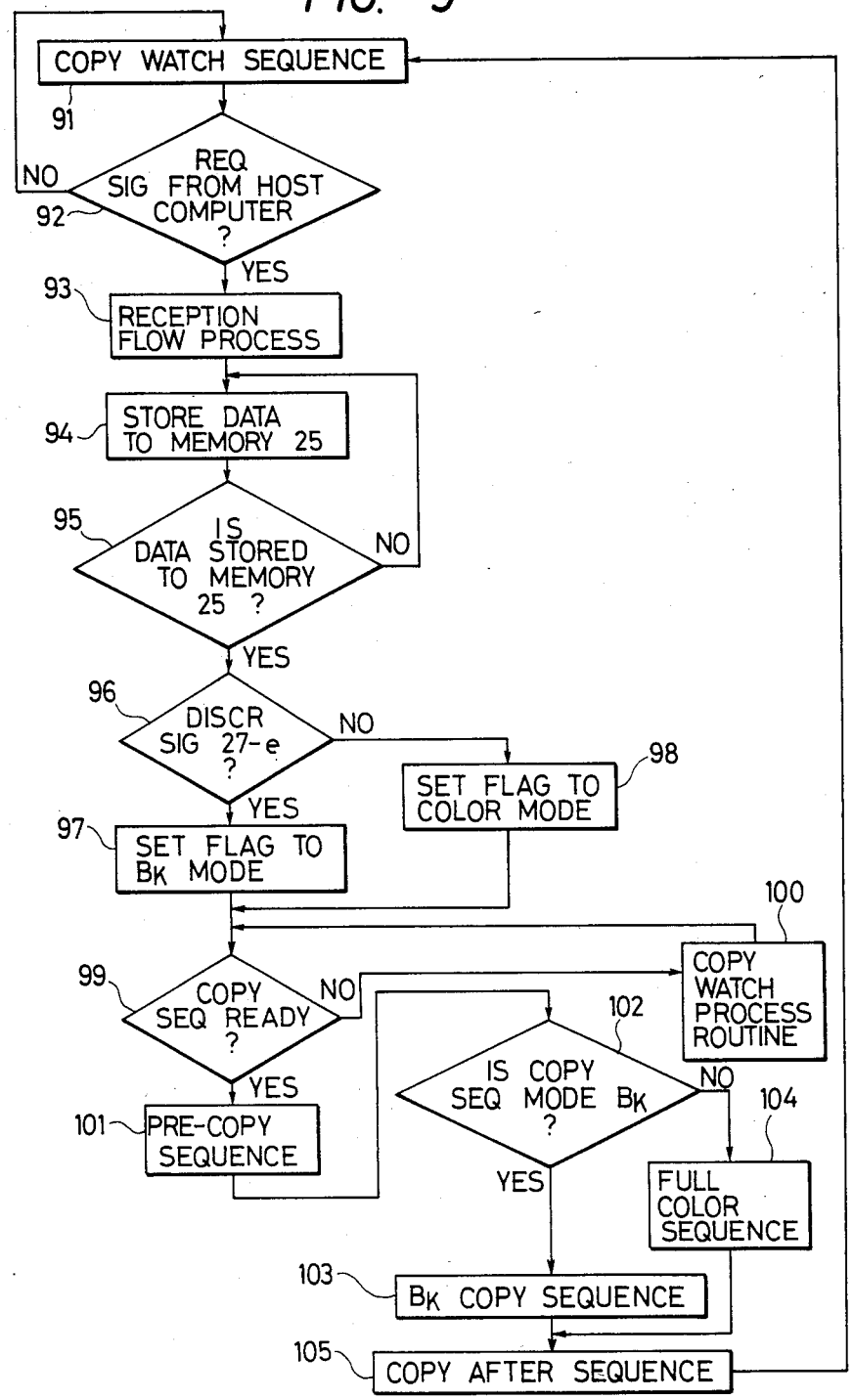
FIGS. 9 and 10 are flow charts.

Next, the controller 27 controls the color LBP unit 26 with the use of the identification signal 27-e in the manner shown in FIG. 9 which shows a flow chart of the computer program of the controller 27. The controller awaits a signal from the host computer at the copy watch sequence step 91, discriminates the presence or absence thereof at Step 92, performs the reception flow process at Step 93 in which the reception enable command is sent out, then stores the data in the memory 25 at Step 94, discriminates whether the data is stored in the memory 25 or not at Step 95, discriminates whether the identification signal 27-e is present or not at Step 96 after confirmation, and sets a flag to the Bk mode (Step 97), if YES, or sets a flag to the color mode (Step 98), if NO.

Then, the controller 27 judges whether the color LBP unit 26 is ready for copying or not (Steps 99 and 100), performs the pre-copy sequence (Step 101), discriminates whether the flag is for the color sequence or black sequence (Step 102), performs the copying operation (Steps 103 and 104), then completes the copy after sequence (Step 105) and returns to the copy watch sequence 91.

The color LBP includes separate dither circuits for Y, M, C and Bk thereby producing a clear copy with the use of the Bk dither when a monochromatic copy is to be produced.

It is also possible to execute the above black sequence with the use of the above mentioned control command data 27-a instead of the identification signal 27-e. That is, as has been mentioned above, before the transmission is started, the controlling monochrome command is sent from the source by which the Bk mode flag is set and hence the above mentioned control can be performed.

Figure 10:
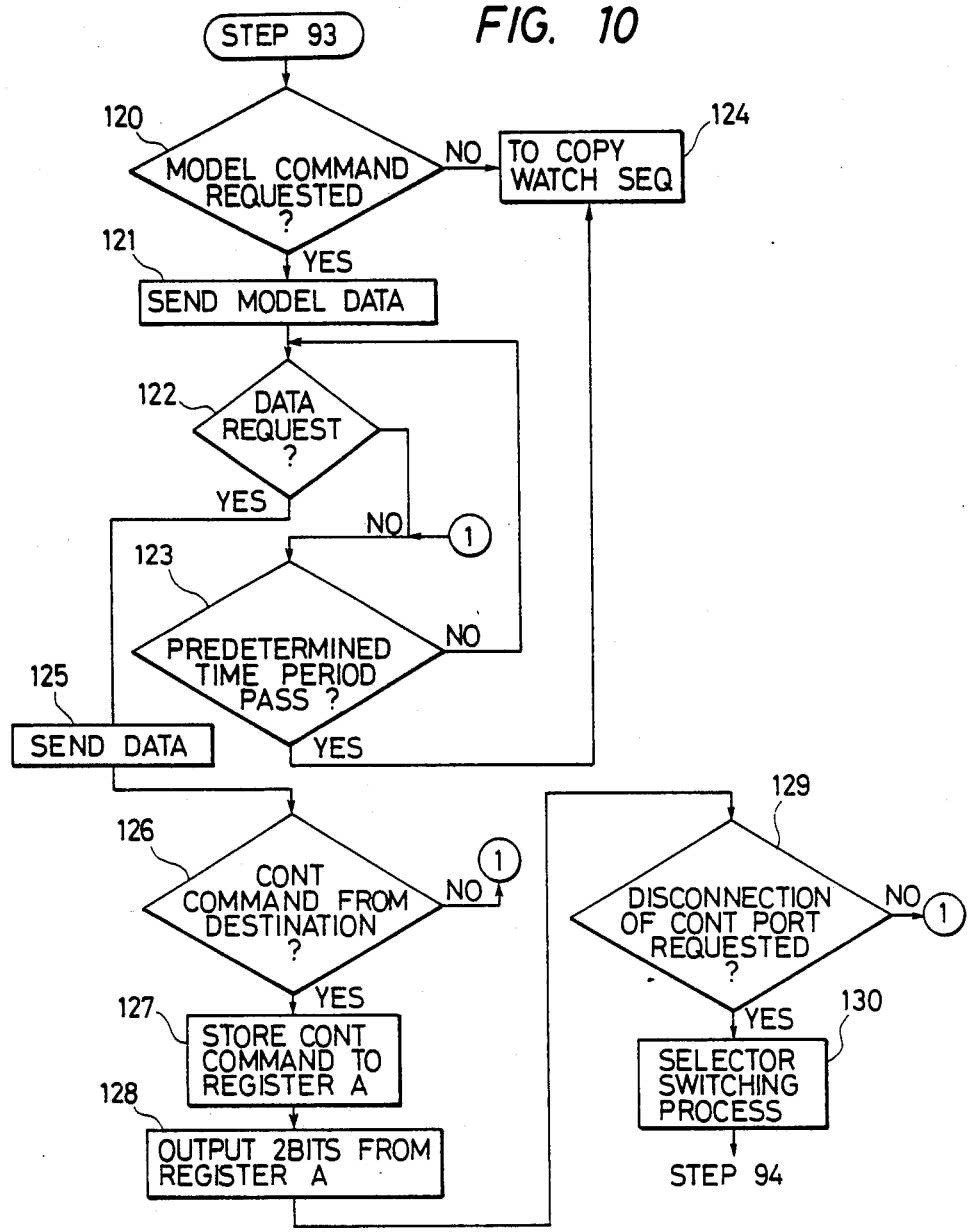
Figure 11:
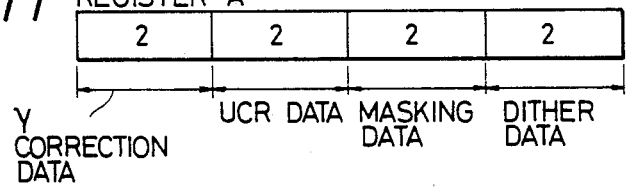

Next, the reception flow process step 93 will be described with reference to FIGS. 10 and 11. As has been mentioned above, when the model command is requested from the host computer 8, the receiver sends the model data (121), waits for the instructions from the host computer (122), steps on the copy watch sequence (124) when no signal is sent from the host computer after a predetermined period of time passes (123) or, when YES, judges whether it is in copying operation or the memory is used because the data request command is sent from the host computer as mentioned above and sends the enable signal to the host computer (125) only when copying and the memory usage are possible. Then the receiver receives the data model signal from the destination (transmitting module) (126) and stores the signal which has been sent as the data model as shown in FIG. 11 in A register (127). 8 bits in the A register are divided into sets of two bits and the control values of the γ correction unit, the masking unit, the UCR unit and the dither unit are controlled with the two-bit data through the lines 29a, 30a, 31a and 32a (shown in FIG. 4) respectively. After the confirmation of the presetting of the control data, the receiver confirms the request for the disconnection of the control port from the destination (129) and switches the selector from the controller to the serial-to-parallel converter (130).

An alternative arrangement having no parallel-to-serial and serial-to-parallel converters permits the ultra-high speed data transmission.

In addition, the image memory may be provided in the host computer instead of in the source and the receiver thereby reducing the cost. However, it is a burden to the host computer.

Further, connecting to a graphic computer, instead of the image pick-up units, increases the number of terminal groups and hence permits the production of a wide variety of color images.

Moreover, the connection between the source and the receiver can also be controlled by the host computer in accordance with such command data as resolving power and speed data other than the black and color data as the request command data. Similarly, the processing sections can be controlled so as to suit to the respective characteristics.

What is claimed is:

1. An image processing system, comprising:
   transmitting means for transmitting digital image data and command data relating to an image reproduction mode sequentially through a single channel;
   means for discriminating the command data transmitted by said transmitting means; and
   means for processing the digital image data transmitted by said transmitting means in accordance with the command data discriminated by said discrimination means;
   wherein said command data is transmitted through the single channel by said transmitting means before the digital image data is transmitted.

2. The image processing system according to claim 1, wherein said command data specifies a gradation characteristic with which said digital image data is to be processed by said processing means.

3. The image processing system according to claim 1, wherein said command data specifies whether a color image or a monochromatic image is to be reproduced from said digital image data.

4. The image processing system according to claim 1, wherein said processing means comprises means for reproducing a color image, and wherein said command data specifies that said color image reproducing means is to reproduce a monochromatic image on the basis of said transmitted digital image data when said transmitted digital image data represents a monochromatic image.

5. The image processing system according to claim 1, wherein said command data specifies a parameter for processing color image data.

6. The image processing system according to claim 1, wherein said command data specifies that color image data is to be converted into monochromatic image data.

7. The image processing system according to claim 1, wherein said command data is transmitted answer data representing a print mode for printing one of a plurality of types of digital image data.

8. An image processing system, comprising:
   means for transmitting digital monochromatic image data and digital color image data;
   means for processing said transmitted digital image data to reproduce an image;
   means for converting said transmitted digital color image data into digital monochromatic image data based on a relative luminosity correction coefficient; and
   means for controlling said processing means to reproduce a monochromatic image from a selected one of said transmitted digital monochromatic image data and said converted digital monochromatic image data.

9. The image processing system according to claim 8, wherein said controlling means discriminates digital monochromatic image data on the basis of the transmitted digital image data and controls said processing means to reproduce a monochromatic image when digital monochromatic image data is discriminated.

10. An image processing system, comprising:
    means having a plurality of image reproduction modes for processing digital image data representing a source image to produce a reproduction image;
    means for discriminating whether said digital image data representing the source image is color image data or monochromatic image data; and
    means for selecting one of said plurality of image reproduction modes in accordance with the result of the discrimination by said discrimination means.

11. The image processing system according to claim 10, wherein said digital image data comprises a plurality of color component data, and wherein said discriminating means discriminates whether said digital image data is color image data or monochromatic image data on the basis of said plurality of color component data.

12. The image processing system according to claim 11, wherein said processing means comprises means for reproducing a color image on the basis of said digital image data.

13. The image processing system according to claim 10, wherein said discriminating means discriminates transmitted command data for discriminating whether said digital image data is color image data or monochromatic image data.

14. The image processing system according to claim 13, wherein said command data is transmitted answer data representing a print mode for printing one of a plurality of types of digital image data.

15. The image processing system according to any of claims 1 through 6 and 8 through 11, wherein said digital image data represents each of a plurality of picture elements with a plurality of bits.

16. The image processing system according to any of claims 1 through 6 and 8 through 11, wherein said processing means comprises means for reproducing either a color image or a monochromatic image on the basis of said digital image data.

* * * * *

UNITED STATES PATENT AND TRADEMARK OFFICE
CERTIFICATE OF CORRECTION

PATENT NO. : 4,739,397

DATED : April 19, 1988

INVENTOR(S) : KIMIYOSHI HAYASHI

It is certified that error appears in the above-identified patent and that said Letters Patent is hereby corrected as shown below:

IN THE DRAWINGS

Figures 1, 1B:
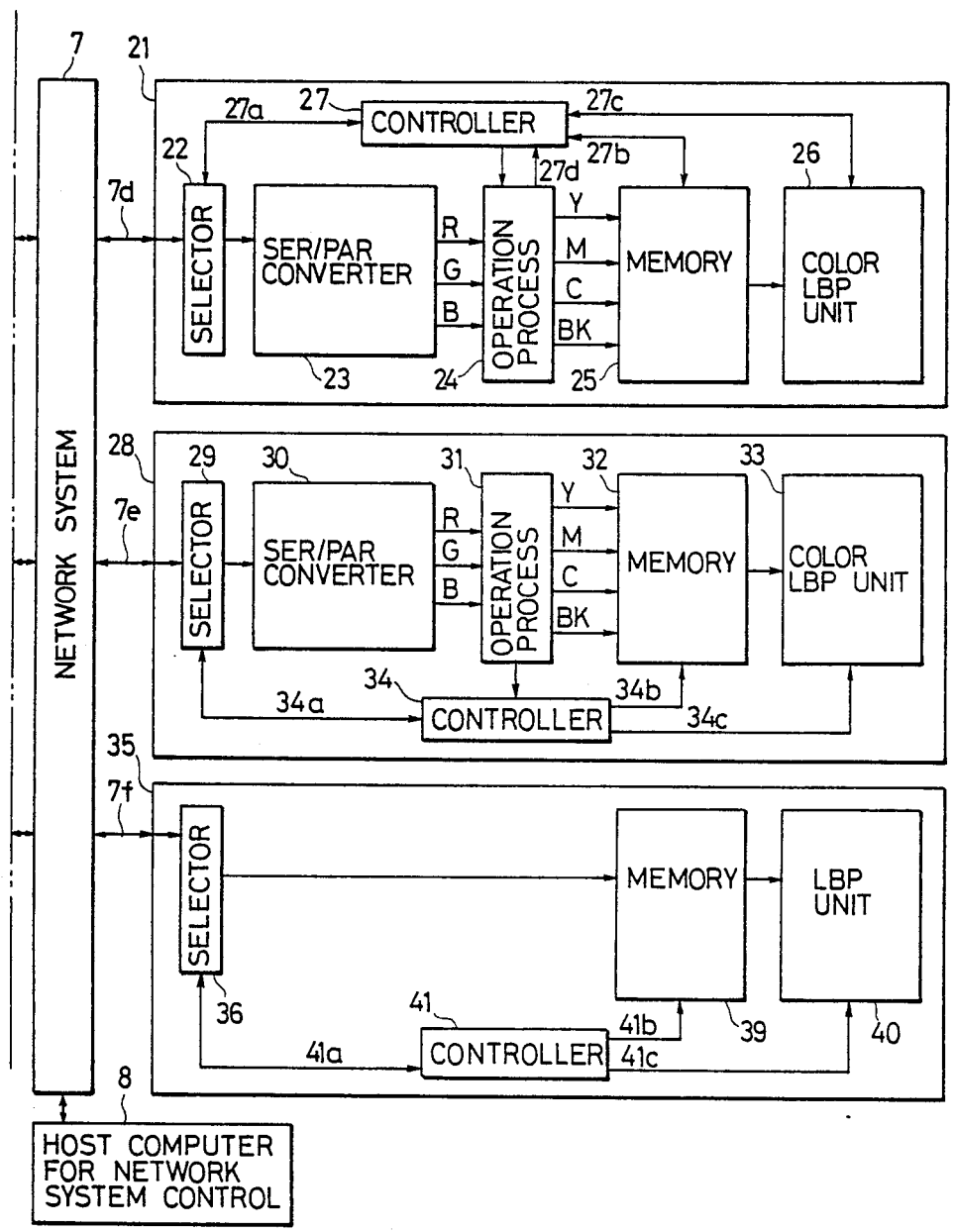
Figures 1, 2, 2A:
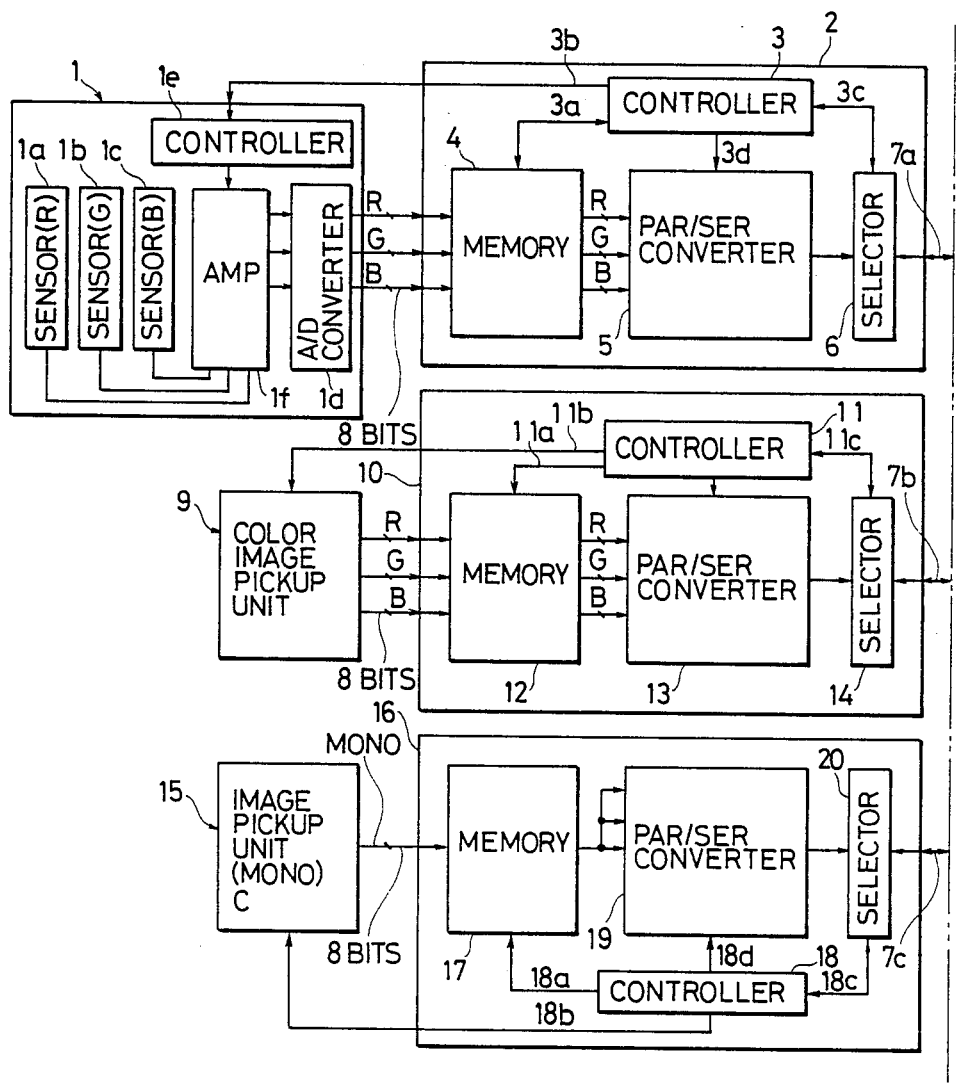

Figures 1-1A and 1-1B should be printed on adjacent sheets such as sheets 1 and 2.
Figures 1-2A and 1-2B should be printed on adjacent sheets such as sheets 3 and 4.

COLUMN 2

Line 36, "CCD" should read --a CCD--.

COLUMN 3

Line 10, "controllor" should read --controller--.
Line 15, "module 1" should read --module 2--.

COLUMN 4

Line 8, "coefficient" should read --coefficient.--
Line 9, "set by unit 24-3. The UCR coefficient" should read --The UCR coefficient set by unit 24-3--.

COLUMN 5

Line 22, "host 8" should read --host computer 8--.
Line 25, "above mentioned" should read --above-mentioned--.
Line 45, "above mentioned" should read --above-mentioned--.

UNITED STATES PATENT AND TRADEMARK OFFICE
CERTIFICATE OF CORRECTION

PATENT NO. : 4,739,397
DATED : April 19, 1988
INVENTOR(S) : KIMIYOSHI HAYASHI It is certified that error appears in the above-identified patent and that said Letters Patent is hereby corrected as shown below:

COLUMN 6

Line 58, "schema (b)" should read --schema of FIG. 6(b)--.

COLUMN 7

Line 6, "above mentioned" should read --above-mentioned--.
Line 34, "above men-" should read --above-men---.
Line 46, "above mentioned" should read --above-mentioned--.
Line 62, "ROM 38-2" should read --ROM 38-3--.

COLUMN 8

Line 23, "pick up" should read --pickup--.
Line 26, "parallel" should read --parallel,--.
Line 39, "pick up" should read --pickup--.
Line 50, "above men-" should read --above-men---.

COLUMN 9

Line 66, "R-Bk UCR ROM 24-25." should read
--R-Bk UCR ROM 24-15.--.

COLUMN 10

Line 11, "R are" or --R signals are--.
Line 52, "above mentioned" should read --above-mentioned--.
Line 57, "above mentioned" should read --above-mentioned--.

UNITED STATES PATENT AND TRADEMARK OFFICE
CERTIFICATE OF CORRECTION

PATENT NO. : 4,739,397

DATED : April 19, 1988

INVENTOR(S) : KIMIYOSHI HAYASHI

It is certified that error appears in the above-identified patent and that said Letters Patent is hereby corrected as shown below:

<u>COLUMN 11</u>

Line 17, "the" should be deleted.

Signed and Sealed this

Thirty-first Day of January, 1989

Attest:

DONALD J. QUIGG

*Attesting Officer*  *Commissioner of Patents and Trademarks*